(No Model.) 2 Sheets—Sheet 1.
A. J. GLASS & H. KIMBALL.
TWO WHEELED HARROW.
No. 362,950. Patented May 17, 1887.
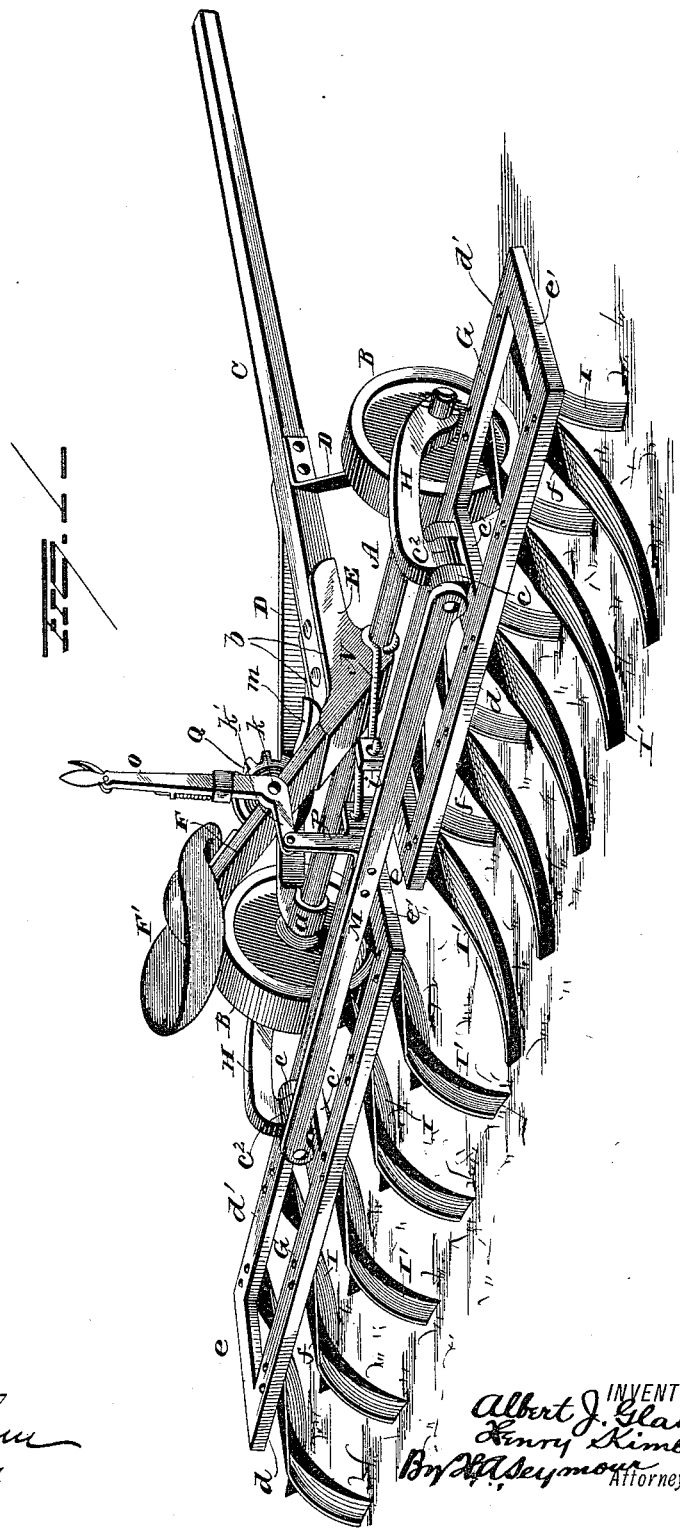
WITNESSES
INVENTORS
Albert J. Glass and
Henry Kimball
By H. A. Seymour
Attorney

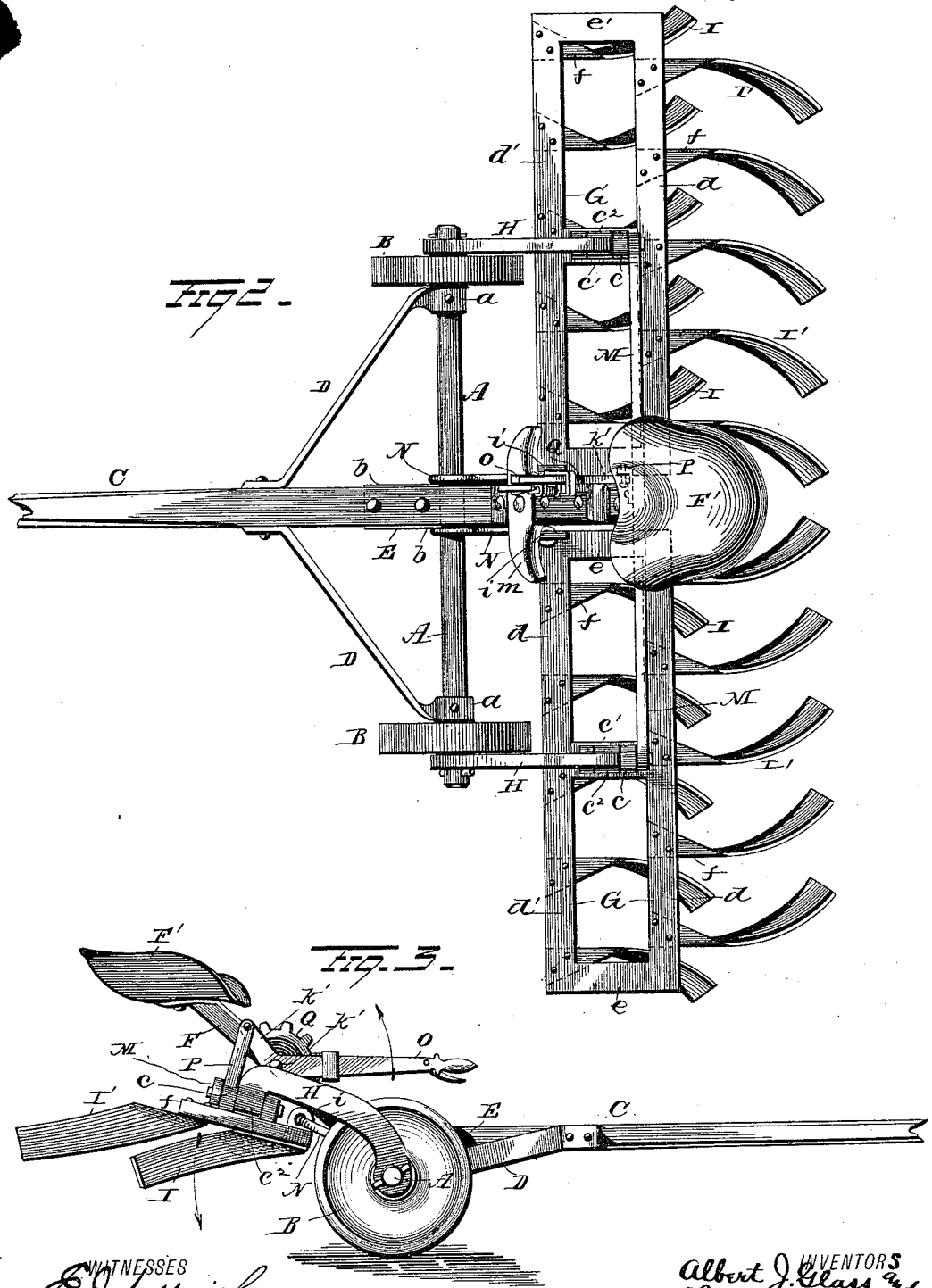

United States Patent Office.

ALBERT J. GLASS AND HENRY KIMBALL, OF JANESVILLE, WISCONSIN, ASSIGNORS TO THE JANESVILLE MACHINE COMPANY, OF SAME PLACE.

TWO-WHEELED HARROW.

SPECIFICATION forming part of Letters Patent No. 362,950, dated May 17, 1887.

Application filed February 11, 1887. Serial No. 227,266. (No model.)

*To all whom it may concern:*

Be it known that we, ALBERT J. GLASS and HENRY KIMBALL, of Janesville, in the county of Rock and State of Wisconsin, have invented certain new and useful Improvements in Two-Wheeled Harrows; and we do hereby declare the following to be a full, clear, and exact description of the invention, such as will enable others skilled in the art to which it appertains to make and use the same.

Our invention relates to an improvement in harrows, and particularly to a class of sulky or wheel harrows in which the teeth or blades are so supported that they may be changed in regard to vertical adjustment or soil contact.

The nature and object of the present invention is to construct a sulky or two-wheel harrow that will have its pulverizing-blades arranged in two rows on two gang-frames that are each hinged to vibrate freely and independently, this vibration or departure from a horizontal plane affording a conforming adjustment of the separate sections to undulations of the soil over which the device moves.

Another feature of our invention is to provide a draft-bar for each frame or gang section that supports the pulverizing-blades, hinging these draft-bars by one of their ends to the gang-frames, and looping the opposite ends of the draft-bars over the axle ends to form a swing-joint at each end, and thus permit a free vertical vibration of the gang-frames.

A further object of our invention is to so connect the hinged blade-supporting frames of the harrow by a rigid bar that by proper adjusting mechanism the two frames can be elevated and secured to clear the ground entirely, or lowered to different points of depressed adjustment with regard to ground-contact.

A further object of our invention is to so construct and secure the pulverizer-blades of our improved harrow that the blades in the two parallel rows affixed to the two vibrating gang-frames will curve in opposite directions and hold the harrow in a right line or prevent a tendency to drift in either direction from the line of draft.

With these ends in view our invention consists in certain features of construction and combinations of parts, that will be hereinafter described, and pointed out in the claims.

Referring to the drawings, making a part of this specification, Figure 1 is a perspective view of the harrow. Fig. 2 is a plan view of the pulverizer or harrow. Fig. 3 represents a side view of the harrow with the gangs in an elevated position.

This harrow is constructed having an axle, A, on which the wheels B are revolubly secured at its ends. The pole or tongue C is attached to the axle A at a point midway between the wheels B. The diagonal braces D are fixed to the tongue C, and extend to embrace the axle at points $a\ a$, close to the wheel-hubs, the integral clips formed on these ends of the braces D being firmly secured to the body of the axle by rivets or other suitable method. A metallic shoe, E, is affixed to the rearward end of the tongue C, to afford a secure means of attachment of the tongue to the axle.

The shoe E is constructed with an open end recess or channel formed on its top surface by the parallel vertical flanges $b$, which are of a proper height to afford side checks or shoulders for the reception of the body of the tongue C, which is rigidly held in place by any approved means. The rear end of the shoe E is adapted by its conformation to firmly support the rearwardly-projected and upwardly-inclined seat-standard F, which extends a proper distance in the directions named to provide a suitable support for the seat F', which is bolted thereto.

The rectangular frames G are preferably made of metal, and are of such a proportionate length that the vertical ears $c\ c$, which are formed on integral cross-bars $c'\ c'$ of these frames, will receive the perforated bosses $c^2$, made on the ends of the draft-bars H. The bosses $c^2$, by their pivotal connection with the ears $c$, form hinge-joints at these points.

The draft-bars H have their opposite ends perforated laterally to fit over the ends of the axle A, these ends being made to project outside the wheels a sufficient distance to afford a bearing for the ends of the bars, as just stated. The bars H are held in position by a split key or other similar device, which will prevent a lateral displacement of the parts and allow a free vertical movement of the bars H and the hinged frames G upon the axle as a pivotal or fulcrum point at each end of the same.

The frames G are preferably made of metal, and are constructed having parallel longitudinal bars $d\ d'$, which are separated by the end portions, $e\ e'$, a suitable distance or space intervening between the bars $d\ d'$, for a purpose that will be presently made plain.

A series of sheet-plate blades, I I', are attached by rivets or screw-bolts to the front and rear bars, $d\ d'$, of the frames G. It will be noticed that these blades are given a degree of curvature sufficient to provide a shear-cutting action of their points and lower edges when they are made to have forcible contact with the soil they are designed to operate upon. The rear ends of the blades I I' are bent at a proper angle to form a flange, $f$, on each blade, these flanges $f$ affording a means of securing the blades upon the under side of the bars $d\ d'$ of the frames G.

The blades I, that are secured to the front bars, $d'$, are made to curve toward the outer ends of the frames G, so that the projecting points and the cutting-edges of the blades have a shear action to throw the earth in slight ridges outwardly. The blades I', that have a fixed position upon the rear bars, $d$, of the frames G, are given a curvature of their bodies in a direction opposite to that of the front blades, I. The outer extremities or points of the blades I' are given such a relative position to the spaced and secured blades I that the shear cutting-edges of the blades I' will cross diagonally the path or furrow of the front row of blades I, and by a reverse action upon these ridges of earth throw the ground in an opposite direction and pulverize it.

The two gang-frames G normally rest in the same horizontal plane, and it will be evident from an inspection of the drawings that the blades in the front series or row on one frame will curve outwardly in an opposite direction to the curvature given the front row of blades on the other gang-frame, and also that the blades of the rear row on each gang-frame will curve inwardly or toward the center of the machine.

Upon the pintles of the hinges which connect the frames G to the draft-bars H, at the rear side of the ears $c$ of these hinges, a connecting-bar, M, is pivoted. This bar M is consequently made to extend in a line parallel to the rear edge of the frames G, and has proper clearance-space above the upper surface of these gang-frames, as shown in Fig. 2. A link, N, is attached at the inner corner of each gang-frame G, these links being hooked into eyes $i$, formed upon the corners of the frames. The opposite ends of the links are bent into rings that are made to encircle the axle A. The length of the links N is such that the depression of the gang-frames G is limited by their action. These links N, however, are mainly intended to aid the draft-bars H and prevent the imposition of an undue strain upon the joints of the hinges that connect the bars H with the frames G. Upon the side of the standard F which carries the seat F' upon its upper end the bent lever O is attached to vibrate upon fulcrum-bolt $k$. The rearwardly-extended short arm $k'$ of the lever O has its free end pivotally connected to the upper end of the vertical standard P, which is rigidly attached to the side of the connecting-bar M.

The lever O has its long arm extended upwardly a proper distance. It is constructed having a suitable handle upon its upper end and a spring locking-dog attached upon one side. This device is fashioned after the well-known reverse-lever rigging in common use, and is adapted to permit a change of adjustment of the position of the lever O by the engagement of the toe of its locking-dog in the notches made in the top edge of the quadrant Q. A foot-rest, $m$, is attached in a convenient position to accommodate the driver of the machine and give purchase for his feet when he is operating the lever O.

The manifest use of the lever O is to elevate or depress the gang-frames G and their attached blades, and thus give complete control over these blades in regard to the depth of working engagement of their shear points and edges with the soil they are made to operate upon; and in case it is desired to throw the gangs out of service—as, for example, at the turning-point in a field, when the machine is to be reversed in its direction of travel, or when the harrow is being transported to or from the place of work—the lever O is depressed to engage the lowest notch of the rack or quadrant Q. This will elevate the blades of the harrow a clearance distance above the surface of the ground, throwing the entire weight of the driver and the gang-frames upon the wheels and axle of the harrow.

While the harrow is in use, the depression of the gang-frames, that is effected by the adjustment of the lever O to approach a vertical position, will cause the weight of the driver to be thrown upon the bar M and frames G, that support this bar, the added weight being a valuable auxiliary to assist the action of the harrow, by holding it steady in stiff soil. The method of attachment of the bar M allows the gang-frames G and attached shovel-blades to conform to the surface of the earth independent of each other, so as to operate as well upon undulating as upon level ground.

By the provision of the two independent gang-frames with the shovel-blades that are attached in two rows upon these frames, the front row being made to curve oppositely or toward the outer ends of the gang-frames and the rear row made to curve inwardly or toward the center line of the machine, the lateral resistance or shear-action that has a tendency to force the harrow from a straight draft line, is prevented from so operating, as the thrust of one set that curve to the right is compensated for by the thrust or side drift of the other set of blades that curve in an opposite direction, and, as before stated, the opposite bends of the front and rear sets of blades in each gang, considered separately, cause the soil to be thoroughly pulverized by the manner in which one row of shovel-blades crosses the track of the other row that precedes it.

The same effect will be obtained by the disposition of the blades of this harrow to cause the front row of shovels or blades of each gang to curve inwardly or toward the center of the harrow, and the rear row of each gang to curve outwardly or toward the ends of the gang-frames, as it would be a mere change of relative positions without any change in the effective working of the machine.

Other slight changes might be made in the constructive features of our present invention without exceeding the scope of the same. We do not therefore desire to limit ourselves to the exact forms shown; but, Having fully described our invention, what we claim as new, and desire to secure by Letters Patent, is—

1. In a two-wheeled harrow, the combination, with an axle and two wheels, of two gang-frames, their curved blades, and two draft-bars that have hinged attachment to the gang-frames and looped connection to the axle, substantially as set forth.

2. In a harrow, the combination, with an axle mounted on wheels, of two gang-frames, a bar pivotally secured at its ends to said frames, draft-bars connecting the frames with the axle, and a lever for elevating both frames, substantially as set forth.

3. In a two-wheeled harrow, the combination, with a tongue, a transverse axle rigidly attached to the tongue, and two wheels, of two gang-frames, their curved blades, two draft-bars hinged to the centers of the gang-frames and connected by looped ends to the axle, substantially as set forth.

4. In a two-wheeled harrow, the combination, with a tongue, a transverse axle, and two wheels, of two gang-frames, draft-bars loosely mounted on the axle and pivotally connected to the respective gang-frames, and a bar pivoted at its ends to the gang-frames near their centers, longitudinally considered, substantially as set forth.

5. In a harrow, the combination, with an axle mounted on wheels, of the gang-frames, each having two parallel rows of pulverizing-blades, the curvature of one row of blades on each gang-frame being inclined in a direction opposite to the other row, draft-bars loosely connecting the gang-frames with the axle, and a bar pivotally connected at its ends to the gang-frames, substantially as set forth.

6. In a two-wheeled harrow, two gang-frames hinge-suspended to vibrate independently, each frame provided with curved pulverizing-blades set in two parallel rows, the blades of one row in a gang inclining to the right, and the corresponding row of blades that aligns with it in the other gang inclining to the left, the lining rows in each gang inclining in opposite directions away from a line central to the axis of the tongue of the harrow, in combination with an axle mounted on wheels, and draft-bars loosely connecting the gang-frames to the axle, substantially as set forth.

7. In a two-wheeled harrow, the combination, with a tongue, a transverse axle rigidly attached to the tongue, and two wheels revolubly secured on the ends of the axle, of two gang-frames, each having two parallel rows of pulverizer-blades, and two draft-bars hinged at one end to the center of the gang-frames and looped at their opposite ends to loosely engage the outer ends of the axle of the harrow, substantially as set forth.

8. In a two-wheeled harrow, the combination, with a tongue, a transverse axle, and two wheels, of two gang-frames, their pulverizer-blades curved in opposite directions, substantially as described, and a draft-bar hinged to each frame near its longitudinal center, each bar being connected loosely to the axle at its ends to vibrate vertically thereon, the frames being thus rendered independent in their vibratory movements, substantially as set forth.

9. In a two-wheeled harrow, the combination, with two wheels, their axle, and a rigidly-connected tongue, of two frames that are each connected by draft-bars to the axle so as to vibrate vertically upon the axle as a pivoted point and rock upon hinged joints in a direction at right angles to the draft-bars, longitudinally considered, substantially as set forth.

10. In a two-wheeled harrow, the combination, with two wheels, their axle, and a tongue rigidly connected to the axle, of two gang-frames, their parallel rows of oppositely inclined and curved pulverizer-blades, a draft-bar for each gang-frame, the bars being hinged to the frames and looped to the axle to permit vibration and rocking motion of the frames in different directions, and a bar pivoted to the longitudinal centers of the gang-frames to raise them together, substantially as set forth.

11. In a two-wheeled harrow, the combination, with two gang-frames loosely connected by hinged draft-bars to the ends of the axle, of two wheels, an axle, a tongue connected by a shoe to the axle near its center, and a seat-standard and seat that projects rearward in a line with the tongue to throw the weight of the driver upon the blades which are rigidly affixed to the gang-frames, substantially as set forth.

12. In a two-wheeled harrow, the combination, with an axle and two wheels, a tongue secured to the axle, a rearward and upward inclined seat-standard and seat, of two gang-frames, their blades, the frames attached to the axle to vibrate vertically in two different directions, a connecting-bar, and ratchet-gear adapted to adjust the frames together at different points of elevated or depressed adjustment, substantially as set forth.

13. In a two-wheeled harrow, the combination, with a tongue, two wheels, and their axle, of two gang-frames, their blades, draft bars to connect the gang-frames near their centers to the ends of the axle, and two links to connect the inner ends of the gang-frames to the body of the axle near the center of this axle, substantially as set forth.

In testimony whereof we have signed this specification in the presence of two subscribing witnesses.

ALBERT J. GLASS.
HENRY KIMBALL.

Witnesses:
WILLIAM STREET,
COLIN C. McLEAN.